US011228933B2

(12) United States Patent
Shi et al.

(10) Patent No.: US 11,228,933 B2
(45) Date of Patent: Jan. 18, 2022

(54) METHOD FOR TRANSMITTING INFORMATION AND TERMINAL DEVICE (71) Applicant: GUANGDONG OPPO MOBILE TELECOMMUNICATIONS CORP., LTD., Guangdong (CN)

(72) Inventors: Cong Shi, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 127 days.

(21) Appl. No.: 16/733,892

(22) Filed: Jan. 3, 2020

(65) Prior Publication Data

US 2020/0145868 A1    May 7, 2020

Related U.S. Application Data (63) Continuation of application No. PCT/CN2018/081968, filed on Apr. 4, 2018.

(51) Int. Cl.
*H04W 24/10* (2009.01)
*H04W 76/28* (2018.01)

(52) U.S. Cl.
CPC .......... *H04W 24/10* (2013.01); *H04W 76/28* (2018.02)

(58) Field of Classification Search
CPC .... H04W 24/10; H04W 76/28; H04L 1/1851; H04L 1/1671; H04L 1/1854
See application file for complete search history.

(56) References Cited

U.S. PATENT DOCUMENTS 10,200,185 B2 *   2/2019   You ............................ H04L 5/16
2014/0254538 A1 *  9/2014   Park ....................... H04W 56/00
                                                                    370/329
(Continued)

FOREIGN PATENT DOCUMENTS

CN    105191439 A    12/2015
CN    106301738 A     1/2017
(Continued)

OTHER PUBLICATIONS

The EESR of corresponding European application No. 18913432.3, dated Jul. 9, 2020.

(Continued)

*Primary Examiner* — Jamaal Henson
*Assistant Examiner* — Chuong M Nguyen
(74) *Attorney, Agent, or Firm* — Ladas & Parry LLP (57) ABSTRACT

A method for transmitting information and a terminal device are disclosed by the embodiments of the present application, where the method includes: receiving, by a terminal device, first information transmitted by a network device at an nth time unit, or transmitting, by the terminal device, the first information to the network device at the nth time unit, where the first information is used to indicate prolonging or stopping of an active Time of DRX; determining, by the terminal device, whether to report CSI and/or SRS to the network device at an (n+m+q)th time unit, where m is determined based on a scheduling timing sequence set and/or an ACK/NACK feedback timing sequence set, and the scheduling timing sequence set and the ACK/NACK feedback timing sequence set respectively comprise multiple values, where q is any integer greater than or equal to 0.

20 Claims, 6 Drawing Sheets (56) References Cited

U.S. PATENT DOCUMENTS

| | | | | |
|---|---|---|---|---|
| 2015/0085712 | A1* | 3/2015 | Wang | H04W 52/0216 370/280 |
| 2015/0208461 | A1* | 7/2015 | Lee | H04L 5/0053 370/311 |
| 2016/0294531 | A1* | 10/2016 | Loehr | H04W 72/0413 |
| 2019/0313331 | A1* | 10/2019 | Zhang | H04W 76/28 |

FOREIGN PATENT DOCUMENTS

| | | |
|---|---|---|
| WO | 2015166846 A1 | 4/2017 |
| WO | 2017082244 A1 | 5/2017 |

OTHER PUBLICATIONS

The First Office Action of corresponding Chinese application No. 201880032529.8, dated May 21, 2020.

CATT;"Handling of the DRX Ambiguous Period", 3GPP Draft; R2-1802147 Handling of the DRX Ambiguous Period-Final, 3rd Generation Partnership Project (3GPP), Mobile Competence Centre; 650, Route Des Lucioles; F-06921 Sopha-Antipolis Cedex; FR, vol. RAN WG2, No. Athens, Greece; Feb. 26, 2018-Mar. 2, 2018 Feb. 14, 2018(Feb. 14, 2018), XP051399143.

CATT;"Leftover Issues on DRX", 3GPP Draft; R2-1800166, 3rd Generation Partnership Prouject (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018 Jan. 12, 2018(Jan. 12, 2018), XP051386051.

"3rd Genenation Partnership Project; Technical Specification Group Radio Access Network; NR; Medium Access Control (MAC) protocal specification (Release 15)", 3GPP Standard; Technical Specification; 3GPP TS 38.321, 3rd Generation Partnership Project (3GPP), Mobile Competence Centre; 650, Route Des Lucioles; F-06921 Sophia-Antipolis Cedex; France, vol. RAN WG2, No. V15.1.0, Apr. 2, 2018(Apr. 2, 2018), pp. 1-67, XP051450732.

OPPO;"CSI and SRS reporting for DRX Active time", 3GPP Draft; R2-1804431-CSI and SRS Reporting for DRX Active Time, 3rd Generation Partnership Project (3GPP), Mobie Competence Centre; 650, Route Des Lucioles; F-06921 Sophia-Antipolis Cedex; Fra, vol. RAN WG2, No. Sanya, China; Apr. 16, 2018-Apr. 20, 2018 Apr. 5, 2018(Apr. 5, 2018), XP051414760.

Panasonic et al."Further Issues on Removing Optionality of CSI/SRS Transmission During Transient State" 3GPP TSG-RAN WG2 Meeting #18 bis, R2-131503, entire document, Apr. 19, 2013.

Panasonic."Further Issues on Removing Optionality of CSI/SRS Transmission During Transient State" 3GPP TSG-RAN WG2 Meeting #18 bis, R2-131204, entire document, Apr. 19, 2013.

International Search Report (ISR) with an English translation dated Jan. 4, 2019 for Application No. PCT/CN2018/081968.

The first Office Action of corresponding European application No. 18913432.3, dated Mar. 19, 2021.

* cited by examiner

METHOD FOR TRANSMITTING INFORMATION AND TERMINAL DEVICE

CROSS-REFERENCE TO RELATED APPLICATIONS

This application is a continuation of International Application No. PCT/CN2018/081968, filed on Apr. 4, 2018, the disclosure of which is hereby incorporated by reference in its entirety.

TECHNICAL FIELD

Embodiments of the present application relate to the field of communications and in particular, relate to a method for transmitting information and a terminal device.

BACKGROUND

In Discontinuous Reception (DRX), if the terminal device is not in active Time, the terminal device will not report Channel State information (CSI) or Sounding Reference Signal (SRS). And the terminal device which is in active Time may prolong the active Time or stop the active Time of the terminal device due to a piece of burst information, which may cause the terminal device to have insufficient time to determine whether to report CSI and/or SRS.

SUMMARY

In view of this, the embodiments of the present application provide a method for transmitting information and a terminal device to enable the terminal device to have sufficient time to determine whether to report CSI and/or SRS.

In a first aspect, a method for transmitting information is provided, the method including: t receiving, by a terminal device, first information transmitted by a network device at an nth time unit, or transmitting, by the terminal device, the first information to the network device at the nth time unit, where the first information is used to indicate prolonging or stopping of an active Time of Discontinuous Reception (DRX); determining, by the terminal device, whether to report Channel State Information (CSI) and/or Sounding Reference Signal (SRS) to the network device at an (n+m+q)th time unit, where m is determined based on a scheduling timing sequence set and/or an Acknowledgement (ACK)/Negative acknowledgement (NACK) feedback timing sequence set, and the scheduling timing sequence set and the ACK/NACK feedback timing sequence set respectively include multiple values, where n is an integer, and q is any integer greater than or equal to 0.

In a possible implementation, the method further includes: determining, by the terminal device, whether at the (n+m+q)th time unit the terminal device is in the active Time of the DRX; the determining, by the terminal device, whether to report Channel State Information (CSI) and/or Sounding Reference Signal (SRS) to the network device at an (n+m+q)th time unit includes: determining, by the terminal device, to report the CSI and/or SRS to the network device if at the (n+m+q)th time unit the terminal device is in the active Time of the DRX and in the case where CSI and/or SRS reporting is configured at the (n+m+q)th time unit; or determining, by the terminal device, not to report the CSI and/or SRS to the network device if at the (n+m+q)th time unit the terminal dev ice is not in the active Time of the DRX.

In a possible implementation, the determining, by the terminal device, whether at the (n+m+q)th time unit the terminal device is in the active Time of the DRX includes: determining, by the terminal device, that at the (n+m+q)th time unit the terminal device is in the active Time of the DRX if the (n+m+q)th time unit is within a duration of a first timer, where start or restart of the first timer is triggered on the basis of the first information or second information which previously indicates to prolong the active Time of the DRX; or determining, by die terminal device, that at the (n+m+q)th time unit the terminal device is not in the active Time of the DRX if the (n+m+q)th time unit is a time unit after a timeout of the first timer.

In a possible implementation, the first information is Downlink Control Information (DCI) for scheduling new transmission data or retransmission data, where m is a minimum value in the scheduling timing sequence set or any value in the scheduling timing sequence set indicated by the DCI.

In a possible implementation, the first information is a Medium Access Control (MAC) Control Element (CE) signaling, where m is a minimum value in the ACK/NACK feedback timing sequence set or any value in the ACK/NACK feedback timing sequence set indicated by the first information.

In a possible implementation, the first information is a scheduling request, and m is a minimum value in the ACK/NACK feedback timing sequence set.

In a possible implementation, the first information is downlink control information (DCI) for scheduling downlink data, and the method further includes: receiving, by the terminal device, a Physical Downlink data Sharing Channel (PDSCH) which carries the downlink data at an (n+p)th time unit, where p is a value of the scheduling timing sequence set, and the PDSCH includes a Medium Access Control (MAC) Control Element (CE) signaling, and the MAC CE is used to indicate to stop the active Time of the DRX; determining, by the terminal device, whether to report the CSI and/or SRS to the network device at an (n+p+r+x)th time unit, where r is a minimum value in the ACK/NACK feedback timing sequence set or any value of the ACK/NACK feedback timing sequence set indicated by the DCI, and x is any integer greater than or equal to 0.

In a possible implementation, a time unit is a time slot or an Orthogonal Frequency Division Multiplexing (OFDM) symbol.

In a second aspect, a terminal device is provided for performing the methods of above first aspect or any of the possible implementations of the first aspect. In particular, the terminal device includes units for performing the methods of the above first aspect or any of the possible implementations of the first aspect.

In a third aspect, a terminal device is provided, the terminal device including: a memory, a processor, an input interface and an output interface, where the memory, the processor, the input interface and the output interface are connected by bus system. The memory is configured to store instructions, and the processor is configured to execute instructions stored in the memory to perform the methods of above first aspect or any of the possible implementations of the first aspect.

In a fourth aspect, a computer memory medium is provided for storing computer software instructions for performing the methods of above first aspect or any of the possible implementations of the first aspect, including programs designed for performing above aspects.

In a fifth aspect, a computer program product including instructions is provided, and when run on a computer, the computer program product causes the computer to perform the methods of above first aspect or any of implementations of the first aspect.

These and other aspects of the present application will be more concise and understandable in the following description of the embodiments.

DESCRIPTION OF EMBODIMENTS

The technical solutions in the embodiment of the present application will be clearly and completely described in the following with reference to the accompanying drawings in the embodiment of the present application.

It should be understood that the technical solutions of the embodiments of the present application can be applied to various communication systems, such as a Global System of Mobile communication (GSM) system, a Code Division Multiple Access (CDMA) system, Wideband Code Division Multiple Access (WCDMA) system, General Packet Radio Service (GPRS), Long Term Evolved (LTE) system, LTE Frequency Division Duplex (FDD) System, LTE Time Division Duplex (TDD), Universal Mobile Telecommunication System (UMTS), Worldwide Interoperability for Microwave Access (WiMAX) communication system, New Radio (NR) or future 5G systems, etc.

In particular, the technical solutions of the embodiments of the present application can be applied to various communication systems based on non-orthogonal multiple access technology, such as a Sparse Code Multiple Access (SCMA) system, and a Low-Density Signature (LDS) system, etc. Of course, the SCMA system and the LDS system may also be referred to as other names in the communication field; further, the technical solutions of the embodiment of the present application can be applied to multi-carrier transmission system using non-orthogonal multiple access technology, for example, Orthogonal Frequency Division Multiplexing (OFDM) which uses non-orthogonal multiple access technology. Filter Bank Multi-Carrier (FBMC), General Frequency Division Multiplexing (GFDM), Filtered-OFDM (F-OFDM) system, etc.

The terminal device in the embodiment of the present application may refer to a User Equipment (UE), an access terminal, a user unit, a user station, a mobile radio station, a mobile station, a remote station, a remote terminal, a mobile device, a user terminal, a terminal, and a wireless communication device, user agent or user apparatus. The access terminal may be a cellular phone, a cordless phone, a Session Initiation Protocol (SIP) phone, a Wireless Local Loop (WLL) station, a Personal Digital Assistant (PDA), an handheld device with wireless communication functions, computing equipment or other processing equipment connected to wireless modems, vehicle equipment, wearable device, terminal device in future 5G networks, terminal device in the future evolution of the Public Land Mobile Network (PLMN), or the like, which is not limited in the embodiment of the present application.

The network device in the embodiment of the present application may be an equipment for communicating with a terminal device, where the network device may be a Base Transceiver Station (BTS) in GSM or CDMA, a NodeB (NB) in a WCDMA system, an Evolutional NodeB (eNB or eNodeB) in the LTE system, or a wireless controller in a Cloud Radio Access Network (CRAN) scenario, or the network device may be a relay station, an access point, a vehicle equipment, a wearable device, a network device in the future 5G network, a network device in the future evolutional PLMN network, or the like, which is not limited in embodiment of the present application.

In a wireless network, when there is data to be transmitted, the UE will always monitor the Physical Downlink Control Channel (PDCCH), receive and transmit the data according to the indication message transmitted by the network side, which results in a large power consumption and data transmission delay of the UE. Therefore, the 3rd Generation Partnership Project (3GPP) standard protocol introduces Discontinuous Reception (DRX) energy saving strategy into the LTE system, where the DRX energy saving strategy is defined in the physical layer Media Access Control (MAC).

In the existing MAC layer protocol, to report CSI and SRS is described as follows: in DRX, if the terminal device is not in the active Time, the terminal device will not report the SRS or the CSI.

The active Time of the DRX refers to the total time in which the UE stays awake after waking up from the DRX. During this time period, the UE monitors the PDCCH, including all states that cause the UE to be in an active state, such as the start of the DRX cycle, or the reception of initial transmitted PDCCH, monitoring of retransmission, or the like. The current protocol includes the following cases:

1. Running times of on Duration Timer, the DRX-Inactivity Timer, the DRX-Retransmission Timer, and the MAC-Contention Resolution Timer;

2. There is a scheduling Request (SR) which has been transmitted to the Physical Uplink Control Channel (PUCCH) and is in a suspended state (that is, the scheduling request has not been met, and so on);

3. There is an uplink grant for a suspended hybrid automatic repeal quest (HARQ) retransmission, and there is data in the corresponding HARQ buffer;

4. After the non-contention random access, the random access response message is successfully received; at this time, there should be a PDCCH transmitted to the UE to indicate a new transmission, though the PDCCH has not been received yet by the UE, and at this time the UE must be in the active state.

Based on the behavior of reporting CSI and/or SRS as specified by the current protocol, the active Time may suddenly be prolonged or stopped due to a piece of burst information. Since the UE may not synchronize with the network, the following problems may occur:

1. The suddenly prolonged active Time may cause the UE to fail to report CSI and/or SRS at the active Time, where the CSI and/or SRS reporting is originally configured in the active Time.

2. The sudden stop of the active Time may cause the terminal to continue to report CSI and/or SRS during the inactive time.

The reason why the above problems occur will be analyzed in detail below with reference to FIGS. 1 and 2.

Figure 1:
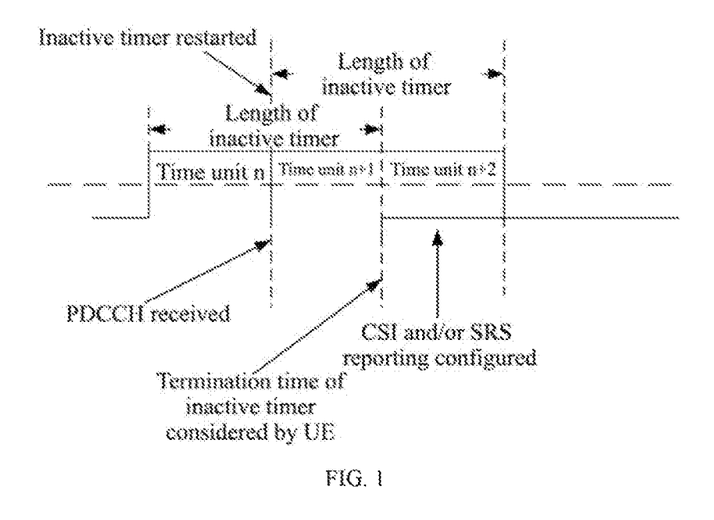
FIG. 1 is a schematic diagram of an application scenario according to an embodiment of the present application.

As shown in FIG. 1, the UE may start or restart the inactive timer from the time unit n. It is assumed that the length of the inactive timer is 2 time units, and the UE considers that the terminal device terminates inactive timer at the time unit (n+1). The network side receives the PDCCH for scheduling data in the time unit n and the time unit (n+1). However, the UE is not synchronized with network side about the transmission and reception, which renders the UE unaware that the inactive timer is restarted at the time unit (n+1); while for the time unit (n+2) at which CSI and/or SRS reporting is configured, the UE considers that it is in an inactive state at the time unit (n+2), Therefore, the UE may not report CSI and/or SRS at the time unit (n+2).

Figure 2:
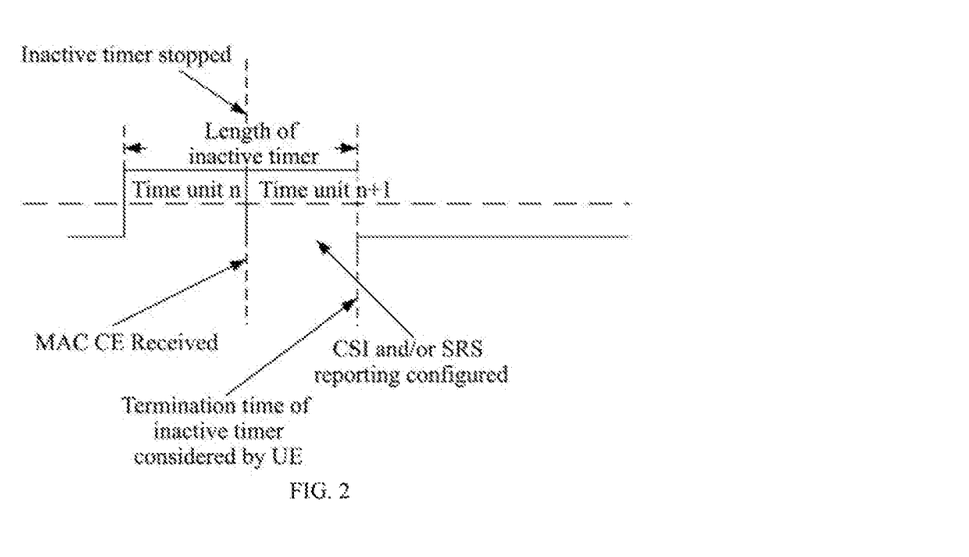
FIG. 2 is a schematic diagram of another application scenario according to an embodiment of the present application.

As shown in FIG. 2, the UE may start or restart the inactive timer from the time unit n. It is assumed that the length of the inactive timer is 2 time units, and the UE considers that the terminal device terminates inactive timer at the time unit (n+1). The network side receives a Media Access Control Control Element (MAC CE) carrying a Physical Downlink Shared Channel (PDSCH) at the time unit n and the time unit (n+1). The UE is not synchronized with network side about the transmission and reception, which renders the UE unaware that the inactive timer has been stopped at the time unit (n+1); while for the time unit (n+1) at which CSI and/or SRS reporting is configured, the UE considers that it is in an active state at the time unit (n+1). Therefore, the UE may report CSI and/or SRS at the time unit (n+1).

Therefore, the embodiment of the present application provides a method for transmitting information in view of the above problems. The technical solutions of the embodiments of the present application will be described in detail below.

Figure 3:
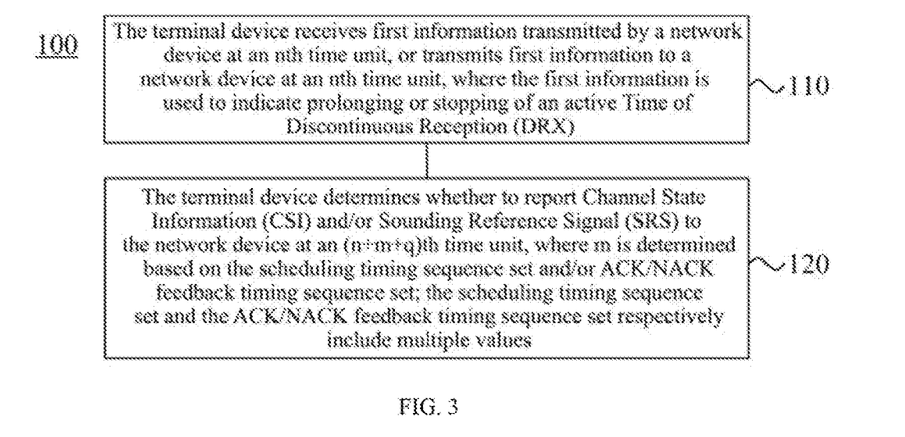
FIG. 3 is a schematic block diagram of a method for transmitting information according to an embodiment of the present application.

FIG. 3 is a schematic block diagram of a method for transmitting information according to an embodiment of the present application. As shown in FIG. 3, the method 100 includes some or all of the following contents:

S110, the terminal device receives first information transmitted by a network device at an nth time unit, or transmits first information to a network device at an nth time unit, where the first information is used to indicate prolonging or stopping of an active Time of Discontinuous Reception (DRX);

S120, the terminal device determines whether to report Channel State Information (CSI) and/or Sounding Reference Signal (SRS) to the network device at an (n+m+q)th time unit, where m is determined based on the scheduling timing sequence set and/or ACK/NACK feedback timing sequence set; the scheduling timing sequence set and the ACK/NACK feedback timing sequence set respectively include multiple values, where n is an integer, and m and q are any integers greater than or equal to 0.

In the embodiment of the present application, a time unit may be a slot, an Orthogonal Frequency-Division Multiplexing (OFDM) symbol or other time domain unit. The slot is taken as example in many places for description, but the embodiment of the present application is not limited thereto.

In LTE, the period from the time the terminal device receives the data PDSCH to the time the terminal feeds back in response to the PDSCH is 4 ms, therefore the terminal device can determine whether to perform CSI and/or SRS 4 ms or more in advance. That is to say, 4 ms is sufficient for the terminal device to determine whether the PDCCH is successfully detected, and whether the PDSCH is successfully detected. For example, the time amount in advance can be determined to be 5 ms.

In NR, there are several points differing from LTE:

1. The PDCCH and its scheduled PDSCH may not be in one slot; the time between the PDCCH and its scheduled PDSCH is represented by live scheduling timing sequence set k0, for example, k0 may take {0, 1, 2, 3} slots, and may be configured by Radio Resource Control (RRC); while in LTE, k0 is 0, that is, the PDCCH and the PDSCH are in the same slot;

2. The time between reception of the PDSCH and the feedback of ACK/NACK is no longer fixed; the time between reception of the PDSCH by the UE and the feedback ACK/NACK by the UE is represented by the acknowledgement (ACK)/Negative Acknowledgement (NACK) feedback timing sequence set k1: this set can also be configured with a set of values by RRC and indicated by DCI; if it is not indicated by the DCI, the time may be 4 slots by default.

In the embodiment of the present application, the method further includes: the terminal device determines whether at the (n+m+q)th time unit the terminal device is in the active Time of the DRX; that the terminal device determines whether to report the Channel State Information CSI and/or the Sounding Reference Signal SRS to the network device at the (n+m+q)th time unit includes: if at the (n+m+q)th time unit, the terminal device is in the active Time of the DRX, in the case where CSI and/or SRS reporting is configured at the (n+m+q)th time unit, the terminal device determines to report CSI and/or SRS to the network device; or if at the (n+m+q)th time, the terminal device is not in the active Time of the DRX, the terminal device determines not to report the CSI and/or SRS to the network device.

In the embodiment of the present application, that the terminal device determines whether at the (n+m+q)th time unit the terminal dev ice is in the active Time of the DRX includes: if the (n+m+q)th time unit is within the duration of the first timer, the terminal device determines that at the (n+m+q)th time unit, the terminal device is in the active Time of the DRX, where the start or restart of the first timer is triggered on the basis of the first information, or the second information which previously indicates to prolong the active Time of the DRX; or if the (n+m+q)th time unit is a time unit after the timeout of the first timer, the terminal device determines that, at the (n+m+q)th time unit, the terminal device is not in the active Time of DRX.

The terminal device can determine the value m based on the scheduling timing sequence set and/or the ACK/NACK feedback timing sequence set. For example, as shown in FIG. 1, the terminal device receives the PDCCH of the scheduling data at the time unit n, and the scheduling timing sequence set configured by the network side for the terminal device is {0, 1, 2, 3} time units; the PDCCH transmitted at the time unit n indicates the "1" in the scheduling timing sequence set to the terminal device, that is to say, the terminal device should receive the PDSCH at the time unit n+1, so that it can be am finned that the PDCCH is successfully detected at the time unit n+1, then the terminal device can determine at the time unit n whether to report the CSI and/or the SRS at the time unit n+1 and after the time unit n+1, where the m in the embodiment of the present application is 1. As shown in FIG. 2, the terminal device receives the PDSCH carrying the MAC CE at the time unit n, where the MAC CE can be used to indicate to stop the active Time of the DRX. The ACK/NACK feedback timing sequence set configured by the network side for the terminal device is {0, 1, 2, 3} time units, and the terminal device may feed back the ACK/NACK information for the PDSCH to the network device in the time unit n+1, then it can be considered that the PDSCH is successfully defected by the terminal device at the time unit n+1, that is to say, the MAC CE is successfully detected, and the terminal dev ice can determine at time unit n whether to report the CSI and/or the SRS at the time unit n+1 and after the time unit n+1, where m in the embodiment of the present application is 1.

The terminal device may accord to the first information that is received by the network device or transmitted to the network device. For example, the first information may be Downlink Control Information (DCI) for scheduling new transmission or retransmission, or a Scheduling Request (SR) for requesting uplink transmission resources, or may be a MAC CE, such as a DRX MA CE command or a long DRX CE command, etc.

In an implementation, if the first information is Downlink Control Information (DCI) for scheduling new transmission data or retransmission data, then m is a minimum value in the scheduling timing sequence set or any value in the scheduling timing sequence set indicated by the DCI. For example, if the scheduling timing set k0 is {0, 1, 2, 3}, then the m may be 0; if the DCI indicates 1 in the k0, then the m is 1.

It should be noted that the data scheduled by the DCI may be downlink data of PDSCH, or uplink data of Physical Uplink Shared Channel (PUSCH), which is not limited in this embodiment of the present application.

In an implementation, if the first information is the Medium Access Control (MAC) Control Element (CE) signaling, where m is a minimum value in the ACK/NACK feedback timing sequence set or any value in the ACK/NACK feedback timing sequence set indicated by the first information. For example, if the ACK/NACK feedback timing sequence set k1 is {0, 1, 2, 3}, then the m may be 0; if the DCI indicates 1 in the k1, then the m is 1.

In an implementation, the first information is a scheduling request, where m is a minimum value in the ACK/NACK feedback timing sequence set. For example, if the ACK/NACK feedback timing sequence set k1 is {0, 1, 2, 3}, then the m may be 0.

It should be noted that, each time the terminal device receives the first information or transmits the first information to the network device, the terminal device needs to determine whether it needs to report CSI and/or SRS for the mth time unit after the time unit n and the following time unit at which time the first information is received or transmitted. And each determination will overwrite the previous determination result. In other words, the solution of the embodiment of the present application can determine in advance whether the CSI and/or the SRS can be reported at each time unit in the time domain.

In the embodiment of the present application, the first information is downlink control information (DCI) for scheduling downlink data, and the method further includes: the terminal device receives the Physical Downlink data Sharing Channel (PDSCH) that carries the downlink data at the (n+p)th time unit, where p is a value of the scheduling timing sequence set, and the PDSCH includes a Medium Access Control (MAC) Control Element (CE) signaling, and the MAC CE is used to indicate to stop the active Time of the DRX; the terminal device determines whether to report the CSI and/or SRS to the network device at (n+p+r+x)th time unit, where r is a minimum value in the ACK/NACK feedback timing sequence set or any value of the ACK/NACK feedback timing sequence set indicated by the DCI; p, r and x are any integers greater than or equal to zero.

Specifically, the terminal device may receive the PDCCH for scheduling the downlink data at tire time unit n, and the terminal device may restart the inactive timer. It is assumed that the length of the inactive timer is y time units, and the terminal device receives PDSCH at the time unit (n+p) according to the scheduling timing sequence set, where the PDSCH includes MAC CE, and p is less than or equal to y, that is to say, the time unit (n+p) is within the length of the inactive timer, then the terminal device can determine in advance at the time unit (n+p) whether to report the CSI and/or SRS to the network device at the time unit (n+p+r) and the following time unit, where r is a minimum value in the ACK/NACK feedback timing sequence set configured according to the network device or any value in the ACK/NACK feedback timing sequence set indicated by the PDCCH.

Embodiments 1 to 3 of the present application will be described in detail below with reference to FIGS. 4 to 6.

Figure 4:
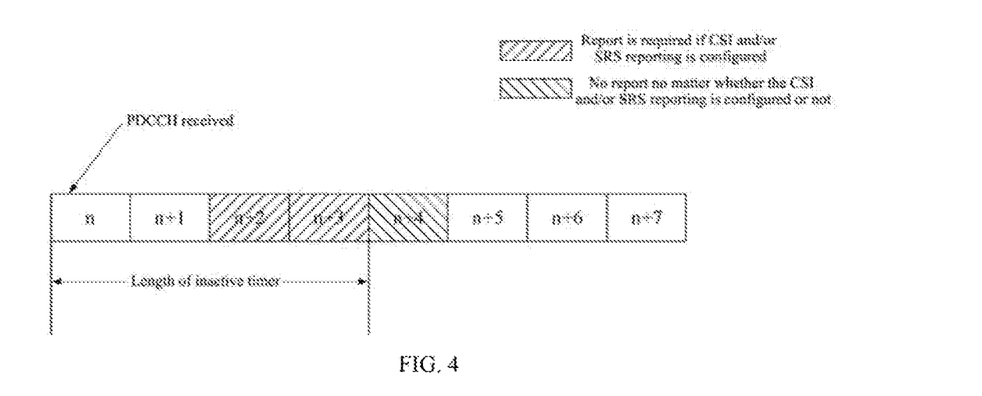
FIG. 4 is another schematic block diagram of a method for transmitting information according to an embodiment of the present application.

Embodiment 1: as shown in FIG. 4, the UE receives a PDCCH in a current slot (such as n), and starts an inactive timer, and the PDCCH schedules new transmission data (possibly uplink or downlink); in the M slots after the current slot n (in this embodiment, the downlink scheduling timing sequence is 2 slots, that is to say, the PDCCH differs from the corresponding PDSCH by 2 slots), the UE determines the (n+2)th slot and whether to report the CSI and/or SRS; if in the (n+2)th slot and the following slots, the UE is estimated to be in active Time (in this embodiment, the length of one inactive timer is 4 slots), if CSI and/or SRS reporting is configured in the slot, the UE reports CSI and/or SRS, such as in slot (n+2) and slot (n+3); if in the (n+2)th slot and following slots, the UE is estimated not to be in active Time, even if CSI and/or SRS reporting is configured in the slot, the UE does not report CSI and/or SRS, such as in slot (n+4), where m is decided by the scheduling timing sequence set k0 of the high-layer configuration, and if k0 includes multiple values, then m is the minimum value of k0, and m may also be a fixed value specified in a protocol, but the fixed value is related to the scheduling timing sequence; the above criteria applies to the DCI which receives scheduling data each time.

Figure 5:
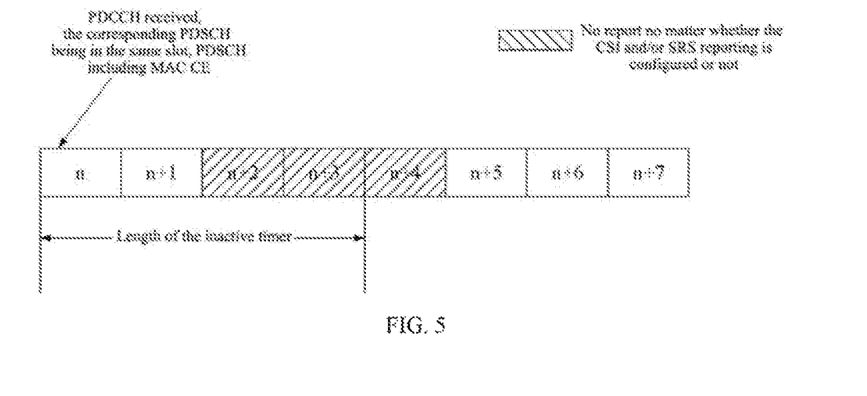
FIG. 5 is yet another schematic block diagram of a method for transmitting information according to an embodiment of the present application.

Embodiment 2: as shown in FIG. 5, the UE receives the downlink data scheduled by PDCCH in the current slot (such as n), and the scheduled PDSCH and PDCCH are in the same slot, and the PDSCH includes the DRX MAC CE command or the long DRX MAC CE command; then the active time is suddenly stopped at the slot, and the terminal determines in the slot n that CSI and/or SRS should not be reported after the m slots (m is 2 in this embodiment, that is to say, the PDSCH differs from the corresponding ACK/NACK by 2 slots); in this embodiment, the terminal determines that in n+2 and following slots, CSI and/or SRS are not to be reported (even if the reporting is configured); where m is decided by the ACK/NACK feedback timing sequence set k1 of the high-layer configuration; if k1 includes multiple values, then in is the minimum value in k1; and m may also be a fixed value specified in a protocol, but the fixed value is related to the scheduling timing sequence.

Figure 6:
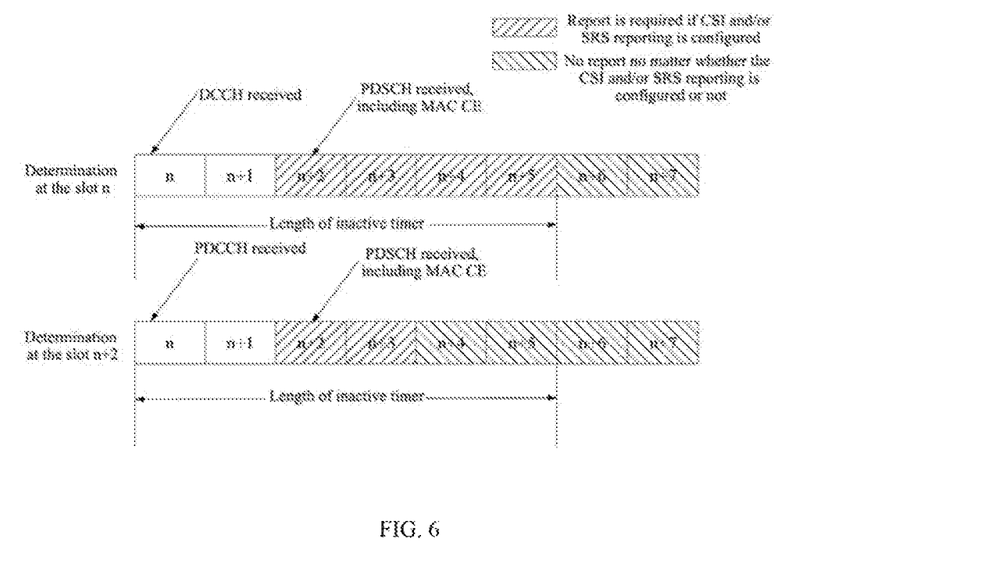
FIG. 6 is yet another schematic block diagram of a method for transmitting information according to an embodiment of the present application.

Embodiment 3: as shown in FIG. 6, the UE receives a PDCCH in a current time slot (such as n), and the PDCCH schedules new downlink data, and the downlink data and the PDCCH are not in a slot, and the downlink data includes a DRX MAC. CE command or long DRX MAC CE command, in this embodiment the PDCCH is in n slots, and the scheduled PDSCH is in n+2 slots (that is to say, the PDCCH differs from the corresponding PDSCH by 2 slots); the UE determines at the current slot n whether to report the CSI and/or SRS in the m slots (in the present embodiment, x=2 slots) after the current slot and the following slots.

If in the (n+2)th slot and the following slots, the CE is estimated to be in the active Time, and if CSI and/or SRS reporting is configured in the slot, the UE reports CSI and/or SRS; in this embodiment, since the length of the inactive timer is 6 slots, slots from n+2 to n+5 are all estimated to be in active Time; if in the (n+2)th slot and following slots, the UE is estimated not to be in active Time, even if CSI and/or SRS reporting is configured in the slot, and the UE does not report CSI and/or SRS; for example, in slot n+6 and the following slots.

In the slot when the MAC CE is received, it is also determined whether, after the r slots, the UE is in active Time (in this embodiment r is 2, that is to say, the PDSCH differs from the corresponding ACK/NACK by 2 slots); then the UE at slot n+2 determines that slot n+4 and following slots are estimated not to be in active Time state. This determination replaces the previous determination, that is, n+4 and n+5 are re-determined to be not in active Time, that is to say, CSI and/or SRS are not to be reported in slot n+4 and following slots (even if the reporting is configured).

The determination time m after the PDCCH is received is decided by the high-level configuration k0, and the determination time r after the MAC CE is received is decided by the high-level configuration k1, and m and r may also be fixed values specified in a protocol, and they also may be equal.

It should be understood that the interaction, related characteristics, functions and the like between the network device and the terminal device described with reference to the network side correspond to related characteristics and functions of the terminal device. The related content has been described in detail in the above method 100, which for brevity, will not be repeated here.

It should also be understood that, in various embodiments of the present application, the serial numbers of the above processes does not mean the order for performing the process, and the order for performing the respective processes should be determined by the function and internal logic, and should not limit the implementing process of the embodiment of the present application.

The method for transmitting information according to an embodiment of the present application is described in detail above, and apparatus for transmitting information according to an embodiment of the present application will be described below with reference to FIG. 7 and FIG. 8, and the technical features described in the method embodiments are applicable to the following apparatus embodiment.

Figure 7:
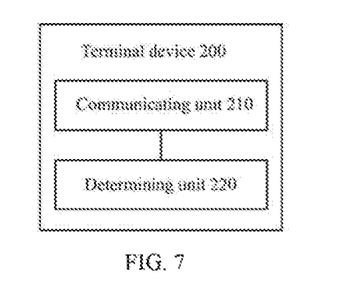
FIG. 7 is a schematic block diagram of a terminal device of an embodiment of the present application.

FIG. 7 is a schematic block diagram of a terminal device 200 of an embodiment of the present application. As shown in FIG. 7, the terminal device 200 includes a communicating unit 210, configured to receive the first information transmitted by network device, or transmuted to the network device at the nth time unit, where the first information is used to indicate prolonging or stopping of the active Time of the DRX;

a determining unit 220, configured to determine whether to report the Channel State Information (CSI) and/or the Sounding Reference Signal (SRS) to the network device at the (n+m+q)th time unit, where in is determined based on the scheduling timing sequence set and/or ACK/NACK feedback timing sequence set, and the scheduling timing sequence set and the ACK/NACK feedback timing sequence set respectively include multiple values, and q is any integer greater than or equal to 0.

Therefore, the terminal device of the embodiment of the present application enables the terminal device to have sufficient time to determine whether to report the CSI and/or SRS.

In the embodiment of the present application, the determining unit is further configured to determine whether at the (n+m+q)th time unit the terminal device is in the active Time of the DRX; the determining unit is specifically configured to determine to report CSI and/or SRS to the network device if at the (n+m+q)th time unit, the terminal device is in the active Time of the DRX and in the case where CSI and/or SRS reporting is configured at the (n+m+q)th time unit; or determine not to report the CSI and/or SRS to the network device if at the (n+m+q)th time the terminal device is not in the active Time of the DRX.

In the embodiment of the present application, the determining unit is specifically configured to determine that, at the (n+m+q)th time unit, the terminal device is in the active Time of the DRX if the (n+m+q)th time unit is within the duration of the first timer, where the start or restart of the first timer is triggered on the basis of the first information or the second information that previously indicates to prolong the active Time of the DRX; or determine that at the (n+m+q)th time unit the terminal device is not in the active Time of DRX if the (n+m+q)th time unit is a time unit after the timeout of the first timer.

In the embodiment of the present application, the first information is Downlink Control Information (DCI) for scheduling new transmission data or retransmission data, where m is a minimum value in the scheduling timing sequence set or any value in the scheduling timing sequence set indicated by the DCI.

In the embodiment of the present application, the first information is a Medium Access Control (MAC) Control Element (CE) signaling, where m is a minimum value in the ACK/NACK feedback timing sequence set or any value in the ACK/NACK feedback timing sequence set indicated by the first information.

In the embodiment of the present application, the first information is a scheduling request, where m is a minimum value in the ACK/NACK feedback timing sequence set.

In the embodiment of the present application, the first information is Downlink Control Information (DCI) for scheduling downlink data, and the communicating unit is further configured to receive the Physical Downlink data Sharing Channel (PDSCH) that carries the downlink data at the (n+p)th time unit, where p is a value of the scheduling timing sequence set, and the PDSCH includes a Medium Access Control (MAC) Control Element (CE) signaling, and the MAC CE is used to indicate to stop the active Time of the DRX; the determining unit is further configured to determine whether to report the CSI and/or SRS to the network device at (n+p+r+x)th time unit, where r is a minimum value in the ACK/NACK feedback timing sequence set or any value of the ACK/NACK feedback timing sequence set indicated by the DCI, x is any integer greater than or equal to zero.

In the embodiment of the present application, a time unit is a time slot or an Orthogonal Frequency Division Multiplexing (OFDM) symbol.

It should be understood that the terminal device 200 according to the embodiment of the present application may correspond to the terminal device in the method embodiment of the present application, and the above and other operations and/or functions of the units in the terminal device 200 are respectively intended to achieve the corresponding process of the terminal device in the method of FIG. 3 to FIG. 6, which for brevity, will not be repeated here.

Figure 8:
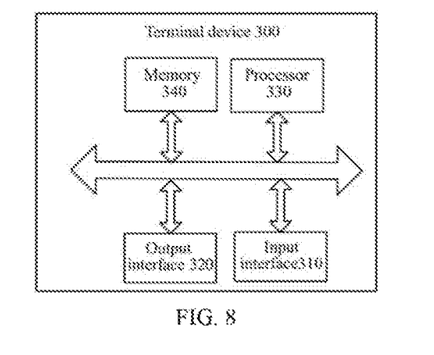
FIG. 8 is another schematic block diagram of the terminal device according to an embodiment of the present application.

As shown in FIG. 8, the embodiment of the present application further provides the terminal device 300, which may be the terminal device 200 in FIG. 7, and can be configured to perform the content of the terminal device corresponding to the method 100 in FIG. 3. The terminal device 300 includes: an input interface 310, an output interface 320, a processor 330, and a memory 340. The input interface 310, the output interface 320, the processor 330, and the memory 340 can be connected by bus system. The memory 340 is configured to store programs, instructions or codes. The processor 330 is configured to perform programs, instructions or codes in the memory 340 to control the input interface 310 to receive signals, control the output interface 320 to transmit signals, and complete the operations in the foregoing method embodiments.

Therefore, the terminal device of the embodiment of the present application enables the terminal device to have sufficient time to determine whether to report the CSI and/or SRS.

It should be understood that in the embodiment of the present application, the processor 330 may be a Central Processing Unit (CPU), and the processor 330 may also be other general purpose processors, digital signal processors, application specific integrated circuits, and field programmable gate array or other programmable logic device, discrete gates or transistor logic device, discrete hardware components, etc. The general purpose processor may be a microprocessor or the processor can be any conventional processor, etc.

The memory 340 can include a read-only memory and a random access memory, and provide instructions and data to the processor 330. A part of the memory 340 may also include a non-volatile random access memory. For example, the memory 340 can also store information of the device type.

In the process of implementation, the content of the above method may be completed by an integrated logic circuit of hardware or an instruction in a form of software in the processor 330. The content of the method disclosed with reference to the embodiments of the present application may be directly completed by a hardware processor or by a combination of hardware and software modules in the processor. The software module can be located in a mature memory medium in the field such as random access memory, flash memory, read only memory, programmable read only memory or electrically erasable programmable memory, registers, and the like. The memory medium is located in the memory 340, and the processor 330 reads the information in the memory 340 and completes the contents of the above method in combination with its hardware. To avoid repetition, details will not be described herein.

In a specific embodiment, the communicating unit in the terminal device 200 can be implemented by the input interface 310 and the output interface 320 in FIG. 8, and the determining unit in the terminal device 200 can be implemented by the processor 330 in FIG. 8.

Those ordinary skilled in the art will realize that the units and algorithm steps of the various examples described in combination with the embodiments disclosed herein can be implemented by electronic hardware or a combination of computer software and electronic hardware. Whether these functions are performed in hardware or software depends on the specific application and design constraint condition of the technical solution. Professional skilled in the art can use different methods to implement the described functions for each particular application, but such implementation should not be considered beyond the scope of the present application.

Those skilled in the art can clearly understand that for the convenience and brevity of the description, as to the specific working process of the system, the apparatus and the unit described above, reference can be made to the corresponding process in the foregoing method embodiment, which will not be repeated herein.

In the several embodiments provided by the present application, it should be understood that the disclosed systems, apparatuses, and methods may be implemented in other ways. For example, the apparatus embodiments described above are merely illustrative, for example, the division of the unit is only a logical function division, in actual implementation, there may be other division manners, for example, multiple units or components may be combined or may be integrated into another system, or some features can be ignored or not performed. On the other hand, the mutual coupling or direct coupling or communication connection shown or discussed may be an indirect coupling or communication connection through some interfaces, apparatuses or units, and may be in electrical, mechanical or other forms.

The units described as separate components may or may not be physically separated, and the components displayed as units may or may not be physical units, that is, the components may be located in one place, or may be distributed to multiple network units. Some or all of the units may be selected according to actual needs to achieve the purpose of the solution of the embodiment.

In addition, respective functional units in embodiments of the present application may be integrated into one processing unit, or each unit may exist physically separately, or two or more units may be integrated into one unit.

This function can be stored on a computer readable memory medium, if the function is implemented in the form of a software function unit and sold or used as an independent product. Based on such understanding, the technical solution of the present application in essence or a part that contributes to the prior art, or a part of the technical solution, may be embodied in the form of a software product which is stored in a memory medium, where the memory medium includes a number of instructions are used to cause a computer device (which may be a personal computer, server, or network device, etc.) to perform all or part of the steps of each embodiment of the present application. The foregoing memory medium includes: a USB drive, a mobile hard disk, a Read-Only Memory (ROM), a Random Access Memory (RAM), a magnetic disk, an optical disk, or other media which can store program codes.

The foregoing is only a specific embodiment of the present application, but the scope of protection of the present application is not limited to this. Any skilled in the art that are familiar with the art can readily think of changes or substitutions within the technical scope disclosed in the present application, and the changes or substitutions should be covered by the scope of protection of this application. Therefore, the scope of protection of the present application should be determined by the scope of protection of the claims.

What is claimed is:

1. A method for transmitting information, comprising:
receiving, by a terminal device, first information sent by a network device at an nth time unit, or sending, by a terminal device, second information to a network device at an nth time unit, wherein the first information and the second information are used to indicate prolonging or stopping of an active Time of Discontinuous Reception (DRX);
determining, by the terminal device, whether to report at least one of Channel State Information (CSD and Sounding Reference Signal (SRS) to the network device at an (n+m+q)th time unit, wherein m is determined based on at least one of a scheduling timing sequence set and an Acknowledgement (ACK)/Negative Acknowledgement (NACK) feedback timing sequence set, and the scheduling timing sequence set and the ACK/NACK feedback timing sequence set respectively comprise multiple values, wherein n is an integer, and m is any integer greater than 0 or equal to 0, and q=1, 2, 3, ... Q, wherein Q is any integer greater than 1;
wherein the terminal device determines at the nth time unit whether to report at least one of the CSI and the SRS at an (n+m+1)th time unit and at least one time unit after the (n+m+1)th time unit.

2. The method according to claim 1, wherein the method further comprises:
determining, by the terminal device, whether at the (n+m+q)th time unit the terminal device is in the active Time of the DRX;
the determining, by the terminal device, whether to report at least one of Channel State Information (CSI) and Sounding Reference Signal (SRS) to the network device at an (n+m+q)th time unit comprises:
determining, by the terminal device, to report at least one of the CSI and SRS to the network device if at the (n+m+q)th time unit the terminal device is in the active Time of the DRX and in the case where at least one of CSI reporting and SRS reporting is configured at the (n+m+q)th time unit; or
determining, by the terminal device, not to report at least one of the CSI and SRS to the network device if at the (n+m+q)th time unit the terminal device is not in the active Time of the DRX.

3. The method according to claim 2, wherein the determining, by the terminal device, whether at the (n+m+q)th time unit the terminal device is in the active Time of the DRX comprises:
determining, by the terminal device, that at the (n+m+q)th time unit the terminal device is in the active Time of the DRX if the (n+m+q)th time unit is within a duration of a first timer, wherein start or restart of the first timer is triggered on the basis of the first information or the second information or information which previously indicates to prolong the active Time of the DRX; or
determining, by the terminal device, that at the (n+m+q)th time unit the terminal device is not in the active Time of the DRX if the (n+m+q)th time unit is a time unit after a timeout of the first timer.

4. The method according to claim 1, wherein the first information is Downlink Control Information (DCI) for scheduling new transmission data or retransmission data, wherein m is a minimum value in the scheduling timing sequence set or any value in the scheduling timing sequence set indicated by the DCI.

5. The method according to claim 1, wherein the first information is a Medium Access Control (MAC) Control Element (CE) signaling, wherein m is a minimum value in the ACK/NACK feedback timing sequence set or any value in the ACK/NACK feedback timing sequence set indicated by the first information.

6. The method according to claim 1, wherein the second information is a scheduling request, and m is a minimum value in the ACK/NACK feedback timing sequence set.

7. The method according to claim 1, wherein the first information is downlink control information (DCI) for scheduling downlink data, and the method further comprises:
receiving, by the terminal device, a Physical Downlink data Sharing Channel (PDSCH) which carries the downlink data at an (n+p)th time unit, wherein p is a value of the scheduling timing sequence set, and the PDSCH comprises a Medium Access Control (MAC) Control Element (CE) signaling, and the MAC CE is used to indicate to stop the active Time of the DRX;
determining, by the terminal device, whether to report at least one of the CSI and SRS to the network device at an (n+p+r+x)th time unit, wherein r is a minimum value in the ACK/NACK feedback timing sequence set or any value of the ACK/NACK feedback timing sequence set indicated by the DCI, and p and r are any integers greater than 0 or equal to 0, and x=1, 2, 3, . . . , X, wherein X is any integer greater than 1.

8. The method according to claim 7, wherein when p is greater than 0, a determination result of the determining, by the terminal device, at the (n+p)th time unit whether to report at least one of the CSI and SRS to the network device at the (n+p+r+x)th time unit is used to replace a determination result for the (n+p+r+x)th time unit that is made by the terminal device at the nth time unit.

9. The method according to claim 1, wherein a time unit is a time slot or an Orthogonal Frequency Division Multiplexing (OFDM) symbol.

10. A terminal device, comprising:
an input interface, an output interface, a processor, and a memory, wherein the memory is configured to store instructions, and when executed by the processor, the instructions cause the input interface to receive first information sent by a network device at an nth time unit, or the instructions cause the output interface to send second information to a network device at an nth time unit, wherein the first information and the second information are used to indicate prolonging or stopping of an active Time of Discontinuous Reception (DRX);
the instructions further cause the processor to determine whether to report at least one of Channel State Information (CSI) and Sounding Reference Signal (SRS) to the network device at an (n+m+q)th time unit, wherein m is determined based on at least one of a scheduling timing sequence set and an Acknowledgement (ACK)/Negative Acknowledgement (NACK) feedback timing sequence set, and the scheduling timing sequence set and the ACK/NACK feedback timing sequence set respectively comprise multiple values, wherein n is an integer, and m is any integer greater than 0 or equal to 0, and q=1, 2, 3, . . . , Q, wherein Q is any integer greater than 1;

wherein the instructions further cause the processor to determine at the nth time unit whether to report at least one of the CSI and the SRS at an (n+m+1)th time unit and at least one time unit after the (n+m+1)th time unit.

11. The terminal device according to claim 10, wherein the instructions further cause the processor to:
determine whether at the (n+m+q)th time unit the terminal device is in the active Time of the DRX;
determine to report at least one of the CSI and SRS to the network device if at the (n+m+q)th time unit the terminal device is in the active Time of the DRX and in the case where at least one of CSI reporting and SRS reporting is configured at the (n+m+q)th time unit; or
determine not to report at least one of the CSI and SRS to the network device if at the (n+m+q)th time unit the terminal device is not in the active Time of the DRX.

12. The terminal device according to claim 11, wherein the instructions further cause the processor to:
determine that at the (n+m+q)th time unit the terminal device is in the active Time of the DRX if the (n+m+q)th time unit is within a duration of a first timer, wherein start or restart of the first timer is triggered on the basis of the first information or the second information or information which previously indicates to prolong the active Time of the DRX; or
determine that at the (n+m+q)th time unit the terminal device is not in the active Time of the DRX if the (n+m+q)th time unit is a time unit after a timeout of the first timer.

13. The terminal device according to claim 10, wherein the first information is Downlink Control Information (DCI) for scheduling new transmission data or retransmission data, wherein m is a minimum value in the scheduling timing sequence set or any value in the scheduling timing sequence set indicated by the DCI.

14. The terminal device according to claim 10, wherein the first information is a Medium Access Control (MAC) Control Element (CE) signaling, wherein m is a minimum value in the ACK/NACK feedback timing sequence set or any value in the ACK/NACK feedback timing sequence set indicated by the first information.

15. The terminal device according to claim 10, wherein the second information is a scheduling request, and m is a minimum value in the ACK/NACK feedback timing sequence set.

16. The terminal device according to claim 10, wherein the first information is downlink control information (DCI) for scheduling downlink data, and the instructions further cause the input interface to:
receive a Physical Downlink data Sharing Channel (PDSCH) which carries the downlink data at an (n+p)th time unit, wherein p is a value of the scheduling timing sequence set, and the PDSCH comprises a Medium Access Control (MAC) Control Element (CE) signaling, and the MAC CE is used to indicate to stop the active Time of the DRX;
the instructions further cause the processor to:
determine whether to report at least one of the CSI and SRS to the network device at an (n+p+r+x)th time unit, wherein r is a minimum value in the ACK/NACK feedback timing sequence set or any value of the ACK/NACK feedback timing sequence set indicated by the DCI, and p and r are any integers greater than 0 or equal to 0, and x=1, 2, 3, . . . , X, wherein X is any integer greater than 1.

17. The method according to claim 16, wherein when p is greater than 0, a determination result of the determining whether to report at least one of the CSI and SRS to the network device at an (n+p+r+x)th time unit is used to replace a determination result for the (n+p+r+x)th time unit that is made by the processor caused by the instructions at the nth time unit.

18. The terminal device according to claim 10, wherein a time unit is a time slot or an Orthogonal Frequency Division Multiplexing (OFDM) symbol.

19. A non-transitory computer-readable memory medium, wherein the non-transitory computer-readable memory medium stores computer software instructions, and when executed, the computer software instructions cause a terminal device to perform the following steps:
receiving, by the terminal device, first information sent by a network device at an nth time unit, or sending, by the terminal device, second information to a network device at an nth time unit, wherein the first information and the second information are used to indicate prolonging or stopping of an active Time of Discontinuous Reception (DRX);
determining, by the terminal device, whether to report at least one of Channel State Information (CSI) and Sounding Reference Signal (SRS) to the network device at an (n+m+q)th time unit, wherein m is determined based on at least one of a scheduling timing sequence set and an Acknowledgement (ACK)/Negative Acknowledgement (NACK) feedback timing sequence set, and the scheduling timing sequence set and the ACK/NACK feedback timing sequence set respectively comprise multiple values, wherein n is an integer, and m is any integer greater than 0 or equal to 0, and q=1, 2, 3, . . . , Q, wherein Q is any integer greater than 1;
wherein determining at the nth time unit whether to report at least one of the CSI and the SRS at an (n+m+1)th time unit and at least one time unit after the (n+m+1)th time unit.

20. The non-transitory computer-readable memory medium according to claim 19, wherein the computer software instructions further cause the terminal device to performing the following steps:
determining, by the terminal device, whether at the (n+m+q)th time unit the terminal device is in the active Time of the DRX;
the step of determining, by the terminal device, whether to report at least one of Channel State Information (CSI) and Sounding Reference Signal (SRS) to the network device at an (n+m+q)th time unit comprises:
determining, by the terminal device, to report at least one of the CSI and SRS to the network device if at the (n+m+q)th time unit the terminal device is in the active Time of the DRX and in the case where at least one of CSI reporting and SRS reporting is configured at the (n+m+q)th time unit; or
determining, by the terminal device, not to report at least one of the CSI and SRS to the network device if at the (n+m+q)th time unit the terminal device is not in the active Time of the DRX.

* * * * *